June 23, 1959 G. THEOCLITUS 2,891,774
HEAT ACCUMULATOR FOR REGENERATOR
Filed June 20, 1957

INVENTOR
Gregory Theoclitus
By Wayne Lang
AGENT

2,891,774

HEAT ACCUMULATOR FOR REGENERATOR

Gregory Theoclitus, Wellsville, N.Y., assignor to The Air Preheater Corporation, New York, N.Y., a corporation of New York Application June 20, 1957, Serial No. 666,900

5 Claims. (Cl. 257—6)

This invention relates generally to heat exchange apparatus and more specifically it relates to a temperature stabilizing heat accumulator adapted to eliminate or reduce changes in temperature of a fluid stream flowing therethrough.

In many applications requiring a stream of heated fluid an excessive fluctuation in the temperature thereof may quite seriously affect the operation for which the hot fluid is required. Therefore, the present invention contemplates the positioning of a mass of heat absorbent material in a fluid stream to dampen the fluctuations by absorbing heat from the fluid when it is cooler than the fluid and to transfer heat to the fluid when it is hotter than the fluid passing therethrough.

More specifically, in regenerative heat exchange apparatus utilizing valving means of the damper type to alternately direct a hot fluid and a relatively cool fluid to be heated over a mass of heat exchange element, the temperature of the heated fluid varies widely in accordance with the variable head that exists between the temperature of the cool fluid to be heated and temperature of the mass of heat exchange element during the interval between switching the damper valves from one position to another. Since heat exchangers of the damper type provide certain unique advantages not common to other heat exchangers it is an object of this invention to provide an arrangement stabilizing the temperature of the fluid heated therein making the use of such a heat exchange means suitable for applications heretofore deemed impractical.

With a temperature stabilizing heat accumulator utilized in a variable temperature fluid stream the nature of the temperature variation is unimportant and any variation irrespective of origin or intensity may be effectively dampened.

The particular details of this invention will be best understood upon consideration of the following detailed description of an illustrated embodiment thereof when read in conjunction with the accompanying drawings in which.

Figure 1:
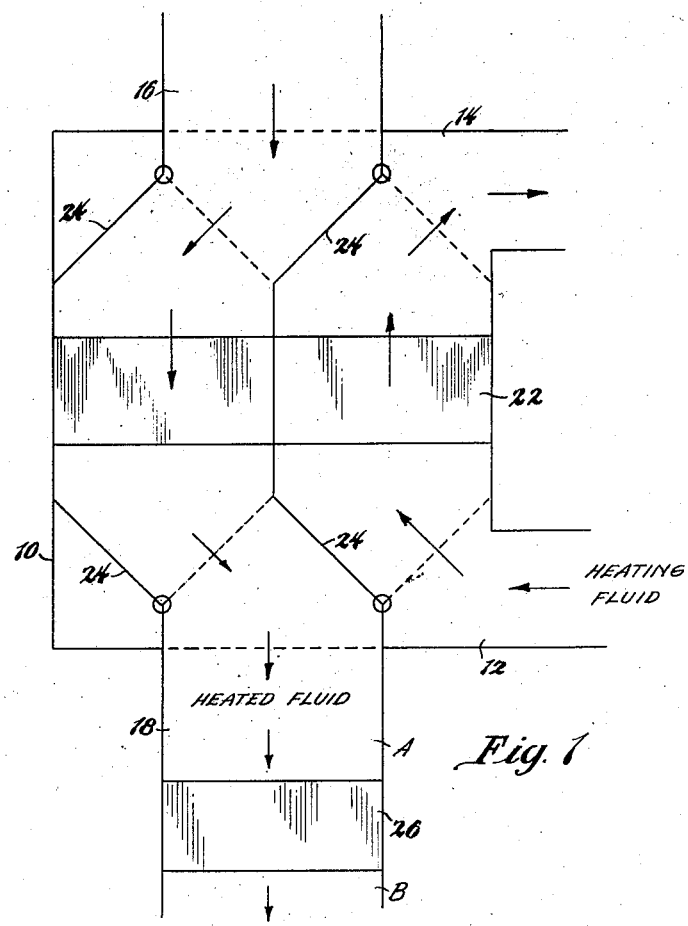
Figure 1 is a sectional elevation of a heat accumulator positioned in the hot air outlet duct of a valve type regenerator.

In the drawing the numeral 10 designates a housing for a valve type regenerative heat exchanger having an inlet 12 and an outlet 14 adapted to permit the flow of a heated fluid in heat exchange relation with a relatively cool fluid which enters the housing through a duct 16 and leaves at 18. As the hot and relatively cool fluids flow through the housing 10 they are alternately directed through spaced portions of a heat absorbent mass 22 by a valving arrangement diagrammatically illustrated at 24 whereby the spaced portions of the heat absorbent mass 22 alternately absorb heat from the hot gas and then transfer it to the cool air flowing therethrough. Since a predetermined portion of the heat absorbent mass is constantly in communication with the hot fluid while an adjacent portion of said mass is in communication with the cooler fluid being heated, the heating process is continuous.

Immediately after the damper valves 24 switch to direct a stream of cool air over a heated portion of the heat absorbent mass, the temperature head between the element mass and the cool air is at a maximum and the temperature of the heated air passing out through outlet duct 18 is at a corresponding maximum. As cool air flows over the heated portion of the heat exchange mass it absorbs heat therefrom to reduce the temperature head between the cool air and heated mass to thereby provide a reduced rate of heat transfer until subsequent switching of valves.

Figure 2:
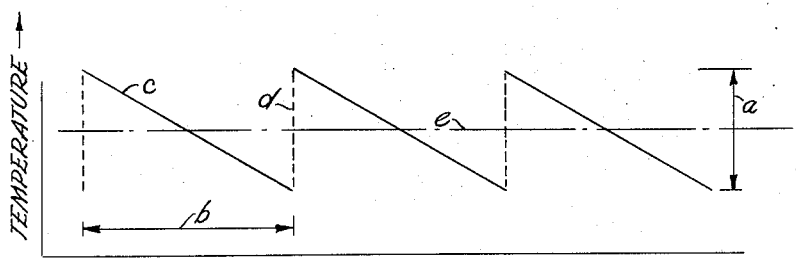
Figure 2 is a graph representing the temperature fluctuation of the fluid leaving the heat exchanger of Figure 1.

Similarly, immediately after switching valves 24 from one position to another (shown in broken line form), the hot gases from inlet 12 are directed over that portion of the element mass 22 previously cooled by cool fluid from inlet 16 to thereby provide a maximum temperature head and a maximum transfer of heat from the gas to the heat exchange mass. Again, as the temperature head between the hot gas and the heat exchange mass is reduced, the transfer of heat occurs at a steadily reduced rate. This relationship is more clearly illustrated by the graph of Figure 2 where the outlet temperature of the fluid at duct 18 is plotted with respect to time or the interval between switching of valves 24. Here $a$ is the magnitude of the temperature change, $b$ is the interval between the switching of valves, $c$ is the variation of temperature with time during the period the valves are stationary, $d$ indicates the rapid change of temperatured uring the switching of valves, and $e$ represents the average temperature of the heated fluid. It is apparent that the temperature of the fluid $a$ varies substantially during the interval $b$ between the switching of valves 24, and it is possible that such an extreme variation might adversely affect the operation of the system for which the heated fluid is required. Therefore, in accordance with the present invention a heat accumulator 26 comprising a mass of porous heat absorbent material is placed in outlet duct 18 to intercept the heated fluid stream emanating from the housing 10. When on passing through the heat absorbent material of accumulator 26 the temperature of the fluid is higher than that of the accumulator mass, the fluid will transfer heat to said mass until such time as there is no temperature differential therebetween. If, however, the temperature of the fluid should drop below that of the heat exchange mass the process would be reversed and heat from the mass would be transferred to the fluid until their temperatures would be equalized.

Figure 3:
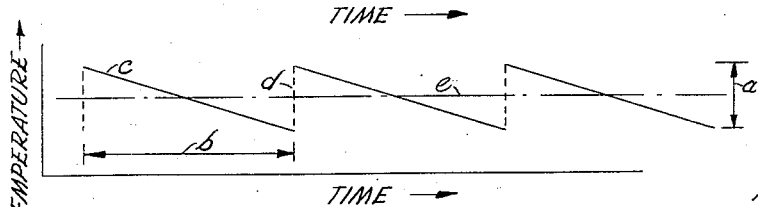
Figure 3 is a graph representing the temperature fluctuation of the fluid leaving the heat accumulator of Figure 1.

The stabilizing effect of heat accumulator 26 is graphically represented by Figure 3 where the temperature of the fluid being exhausted from the accumulator 26 is plotted with respect to time. Here the same pattern of temperature variation appears as was shown in Figure 2, however, the magnitude $a$ of the temperature change has been reduced markedly so that the extremes of the temperature variation now approach the average temperature indicated at $e$.

While this invention has been described with reference to the embodiment illustrated in the drawing, it is evident that numerous changes could be made without departing from the spirit of the invention, and it is intended that all matter contained in the above description or shown in the accompanying drawings shall be interpreted as illustrative and not in a limiting sense.

What I claim is:

1. Heat exchange apparatus including in combination a heat exchanger comprising a housing having spaced inlet and outlet ducts for the flow of a first and second fluid therethrough, and a quantity of heat absorbent material in said housing adapted to be alternately disposed in the first duct to absorb heat from the fluid flowing therethrough and then in the second duct to impart heat to the fluid flowing therethrough; and a heat accumulator in the outlet duct for the second fluid adapted to stabilize the temperature of the fluid flowing therethrough.

2. Heat exchange apparatus including in combination a regenerative heat exchanger comprising a housing having spaced inlet and outlet ducts for the flow of a heating fluid and a heated fluid therethrough and a mass of heat absorbent material carried by said housing adapted to be exposed to the heating fluid to absorb heat therefrom and to the heated fluid to transmit heat thereto; valve means intermittently directing the heating fluid and the heated fluid through the mass of heat exchange material carried by said housing; and a quantity of heat absorbent material carried in the outlet duct for the heated fluid adapted to absorb heat from said fluid when it is cooler than the fluid and to transfer heat thereto when it is hotter than the fluid whereby the temperature of said heated fluid is materially stabilized.

3. Heat exchange apparatus including in combination a regenerative heat exchanger comprising a housing having spaced inlet and outlet ducts for the flow therethrough of a heating fluid and a heated fluid in heat exchange relation, and a mass of heat absorbent material carried by said housing adapted to be exposed to the heating fluid to absorb heat therefrom and to the heated fluid to transmit heat thereto; damper valve apparatus adapted to alternately direct the heating fluid and the heated fluid through the mass of heat exchange material carried by said housing; and a separate mass of heat absorbent material carried by the outlet duct for the heated fluid adapted to absorb heat from said fluid when it is cooler than the fluid and to transfer heat thereto when it is hotter than the fluid.

4. Heat exchange apparatus including in combination a valve type regenerative heat exchanger comprising a housing having spaced inlet and outlet ducts for the flow therethrough of a first and second fluid in heat exchange relation, and a mass of heat absorbing material carried in said housing adapted to be exposed to the first fluid to absorb heat therefrom and to the second fluid to transmit heat thereto; valve means adapted to alternately direct the first fluid and the second fluid through the mass of heat exchange material carried by said housing; and a quantity of heat absorbing material carried by the outlet duct for the second fluid to stabilize the temperature of the fluid passing therethrough, said mass of heat exchange material carried by the housing having a substantially greater heat capacity than the quantity of heat absorbing material carried by the outlet duct for the second fluid.

5. Heat exchange apparatus including in combination a valve type regenerative heat exchanger comprising a housing having spaced inlet and outlet ducts for the flow therethrough of a first heating fluid and a second fluid to be heated, a mass of heat absorbing material carried by said housing adapted to be exposed to the first fluid to absorb heat therefrom and then to the second fluid to transmit heat thereto; damper valve means adapted to intermittently direct the first fluid and the second fluid through the mass of heat absorbing material carried by the housing to continuously subject the second fluid to be heated to a heated portion of said heat absorbing material; and a heat absorbent mass carried by the outlet duct for the second fluid adapted to stabilize the temperature of the fluid passing therethrough.

References Cited in the file of this patent

UNITED STATES PATENTS

| | | |
|---|---|---|
| 1,706,846 | Fisher | Mar. 26, 1929 |
| 1,820,199 | Riley | Aug. 25, 1931 |
| 2,616,668 | Van Weenen et al. | Nov. 4, 1952 |
| 2,738,854 | Thrower | Mar. 20, 1956 |